United States Patent
Morishita et al.

[11] Patent Number: 5,976,729
[45] Date of Patent: Nov. 2, 1999

[54] CELL WHICH SECURES THE RELIABILITY OF A PROTECTIVE CIRCUIT

[75] Inventors: Takuma Morishita, Mihara-gun; Kazuro Moriwaki, Sumoto; Masatoshi Takahashi, Mihara-gun; Kensuke Nakatani, Sumoto, all of Japan

[73] Assignee: Sanyo Electric Co., Ltd., Osaka, Japan

[21] Appl. No.: 08/821,680

[22] Filed: Mar. 20, 1997

[30] Foreign Application Priority Data

Mar. 27, 1996 [JP] Japan .................................. 8-071986
Mar. 5, 1997 [JP] Japan .................................. 9-050443

[51] Int. Cl.⁶ ...................................................... H01M 2/34
[52] U.S. Cl. .............................. 429/65; 429/94; 429/121; 429/178
[58] Field of Search .................................. 429/4, 61, 62, 429/94, 194, 65, 121, 178, 324

[56] References Cited

U.S. PATENT DOCUMENTS

| | | |
|---|---|---|
| 4,379,816 | 4/1983 | Mullersman et al. . |
| 4,971,867 | 11/1990 | Watanabe et al. ........................ 429/61 |
| 4,981,490 | 1/1991 | Machida ..................................... 429/4 |
| 5,135,821 | 8/1992 | Takemura et al. ......................... 429/65 |
| 5,455,128 | 10/1995 | Tanaka .................................. 429/194 X |

FOREIGN PATENT DOCUMENTS

| | | |
|---|---|---|
| 0 384 204 A1 | 2/1990 | European Pat. Off. . |
| 0 629 022 A1 | 5/1994 | European Pat. Off. . |
| 3614849 A1 | 5/1986 | Germany . |
| 58-35863 | 3/1983 | Japan . |
| 61-279052 | 12/1986 | Japan . |
| 63-121246 | 5/1988 | Japan . |
| 64-72458 | 3/1989 | Japan . |
| 3-8257 | 1/1991 | Japan . |
| 4-75254 | 3/1992 | Japan . |

*Primary Examiner*—Stephen Kalafut
*Attorney, Agent, or Firm*—Foley & Lardner

[57] ABSTRACT

A cell has an outer can made from either aluminum or an aluminum alloy, and a lead plate for current-utilization. The lead plate for current-utilization is welded to the outer surface of the outer can and further welded to a lead plate for connection which is connected with the protective circuit of the cell. This construction makes it possible to avoid directly connecting the outer can with the lead plate for connection. Consequently, the lead plate for connection can be resistance-welded, so that the protective circuit is prevented form being electrified. As a result, the reliability of the protective circuit is improved, as compared with the case where the lead plate for connection is laser-welded.

19 Claims, 7 Drawing Sheets

CELL WHICH SECURES THE RELIABILITY OF A PROTECTIVE CIRCUIT

BACKGROUND OF THE INVENTION (1) Field of the Invention

The present invention relates to a cell, and more specifically to a cell which secures the reliability of a protective circuit electrically connected with the cell.

(2) Description of the Related Art

Generally, a lithium ion cell is provided with an external protective circuit for controlling the cell voltage, thereby preventing overcharge and over-discharge. For example, a conventional lithium ion cell 11 shown in FIG. 1 is electrically connected with a protective circuit 13 via a lead plate 12, which can be made from nickel, nickel-plated stainless, or the like, considering its connectivity with the protective circuit 13.

On the other hand, an outer can 14 of the cell 11 whose voltage grows as high as 3.5–5.0V during a charging operation is not made of iron or stainless but of aluminum or an aluminum alloy. This is because unlike iron and stainless, aluminum does not cause the outer can 14 to corrode during a long-term preservation in a high voltage. In addition, unlike iron and stainless which have large specific gravity, aluminum which has small specific gravity allows the outer can 14 to have a large gravimetric energy density.

However, when it comes to the welding of the lead plate 12 made of nickel or the like and the outer can 14 made of aluminum or the like, the insolubility of the lead plate 12 makes it impossible to employ the ultrasonic welding and the good conductivity of the outer can 14 makes it impossible to employ the resistance welding. For this reason, the laser welding has been employed to combine the lead plate 12 and the outer can 14.

However, the laser welding also has a drawback that a laser beam causes the protective circuit 13 to be electrified, thereby deteriorating its reliability.

SUMMARY OF THE INVENTION

The object of the present invention is to provide a cell which secures the reliability of a protective circuit electrically connected with the cell.

Another object of the present invention is to provide a cell whose lead plate for current-utilization and whose lead plate for connection are welded with a sufficient welding strength through the resistance welding.

Yet another object of the present invention is to provide a cell which prevents the occurrence of cracks or pinholes on the weld zone of the lead plate for current-utilization and the outer can.

The above objects can be achieved by a cell comprising a positive electrode; a negative electrode; a separator filled with an electrolyte; an outer can which has a bottom and which is composed of either aluminum and an aluminum alloy; and a first lead plate for utilizing current. The first lead plate is welded to an outer surface of the outer can, and also welded to a second lead plate for electrically connecting the cell with a protective circuit.

The reason for the successful achievement of these objects is as follows.

By welding a lead plate for current-utilization to the outer surface of the outer can, and then welding the lead plate for current-utilization to the lead plate for connection which is electrically connected with the protective circuit of the cell, it becomes possible to avoid directly connecting the outer can with the lead plate for connection. This allows the resistance welding to be employed for welding the lead plate for connection, if the lead plate for current-utilization is made from a material suitable for the resistance welding. As a result, the protective circuit can be prevented from being electrified. Consequently, the reliability of the protective circuit can be improved, as compared with the case where the laser welding is employed for welding the lead plate for connection.

It may seem that if the outer can and the lead plate for connection are directly laser-weld together before electrically connecting the protective circuit with the lead plate for connection, then the lead plate for current-utilization is dispensable so that the reliability of the protective circuit can be improved. However, this method is not suitable because while the cell is being carried to the welding process of the protective circuit after the outer can and the lead plate for connection have been laser-welded, short circuit or another problem may be caused due to the lead plate for connection protruding from the outer can.

The first lead plate may be made from a metal whose conductivity is lower than aluminum and the aluminum alloy.

The material of the first lead plate may be selected from a group consisting of nickel, iron, a nickel alloy, and an iron alloy.

Thus, the lead plate for current-utilization and the lead plate for connection can be firmly welded through the resistance welding by using a metal plate made from nickel, iron, a nickel alloy, or an iron alloy because these metals have a lower conductivity than aluminum, or the like.

The outer can and the first lead plate may be laser-welded.

The first lead plate may include a cladding plate having a first layer which is made from either aluminum or the aluminum alloy and welded to the outer can, and a second layer which is welded to the second lead plate.

Thus, when the first layer of the lead plate for current-utilization is made of the same aluminum or aluminum alloy as the outer can, the ultrasonic welding can be employed to weld the lead plate for current-utilization to the outer can. The use of the ultrasonic welding for this welding makes the first layer and the outer can activate as the effect of the ultrasonic vibration during the welding, and also causes the plastic flow of the surface of the welding material as the effect of the frictional heat of ultrasonic waves. As a result, the atoms contained in the first layer and the outer can are combined or mixed at the surface, which makes the first layer and the outer can be welded together. Since the outer can and the lead plate for current-utilization are welded together in such a mechanism, a smaller heat value is required for the welding than the laser welding. Consequently, the occurrence of cracks or pinholes in the weld zone can be prevented.

Since the lead plate for current-utilization is welded not to a finished cell but to an outer can to which the electrode assembly consisting of negative and positive electrodes and a separator is inserted, the electrode assembly is not affected by the energy, vibration, or pressure of the ultrasonic waves, and as a result, the reliability of the cell is improved. Although the lead plate for current-utilization and the lead plate for connection are welded together after the cell is completed, the outer can does not suffer from cracks or pinholes because the resistance welding is employed in this case.

The ultrasonic welding requires fewer welding requirements and usage conditions than the laser welding, and it is possible to prevent the welding strength from varying widely.

In addition, ultrasonic welding devices are less expensive than laser welding devices. This makes it possible to reduce the production cost of cells, and to produce more cells per hour.

The outer can and the first lead plate may be ultrasonic-welded.

The first layer may have a thickness of 0.05 to 0.5 mm.

The reason for these restrictions is that if the second layer of the lead plate for current-utilization and the lead plate for connection are resistance-welded outside these ranges, the weld zone might suffer from cracks.

The second layer may be a metallic plate whose conductivity is lower than aluminum and the aluminum alloy.

By making the second layer of the lead plate for current-utilization from nickel or the like having lower conductivity than aluminum or the like, the lead plate for current-utilization and the lead plate for connection are firmly welded through the resistance welding.

The material of the second layer may be selected from a group consisting of nickel, nickel-plated iron, nickel-plated stainless, and nickel-plated copper.

The material of the positive electrode may be selected from a group consisting of $LiCoO_2$, $LiNiO_2$, $LiMnO_2$, $LiMn_2O_4$, and $LiFeO_2$.

The solvent of the electrolyte may be at least one organic solvent which is selected from a group consisting of ethylene carbonate, vinylene carbonate, and propylene carbonate, or a mixture of the at least one organic solvent and at least one low-boiling-point solvent which is selected from a group consisting of dimethyl carbonate, diethyl carbonate, 1,2-dimethoxyethane, 1,2-diethoxyethane, and ethoxymethoxyethane.

The solute of the electrolyte may be selected from a group consisting of $LiPF_6$, $LiClO_4$, and $LiCF_3SO_3$.

The material for the negative electrode may be selected from a group consisting of lithium, an alloy which absorbs and desorbs lithium ions, and carbon material which absorbs and desorbs lithium ions.

DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Embodiment 1

The first embodiment of the present invention will be explained with reference to FIGS. 2 and 3.

Figure 1:
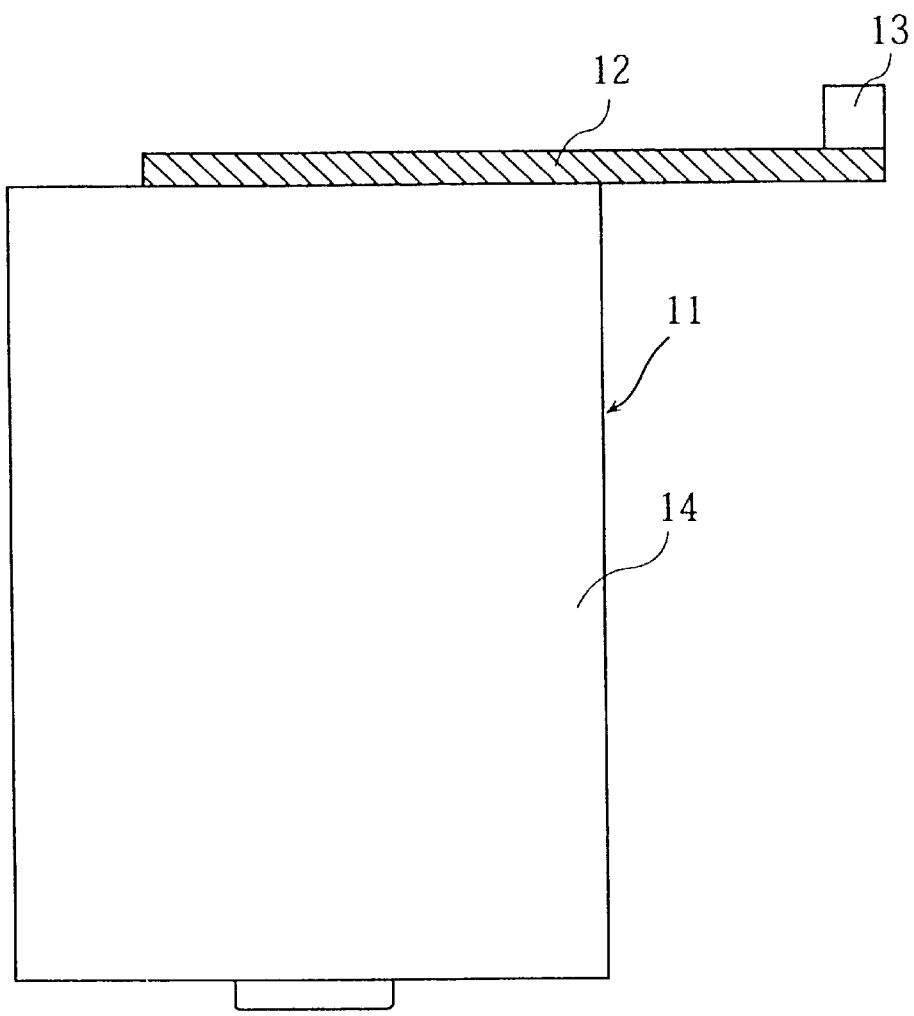
FIG. 1 is a cross section which shows a welding process of a lead plate for connection to a conventional cell.
Figure 2:
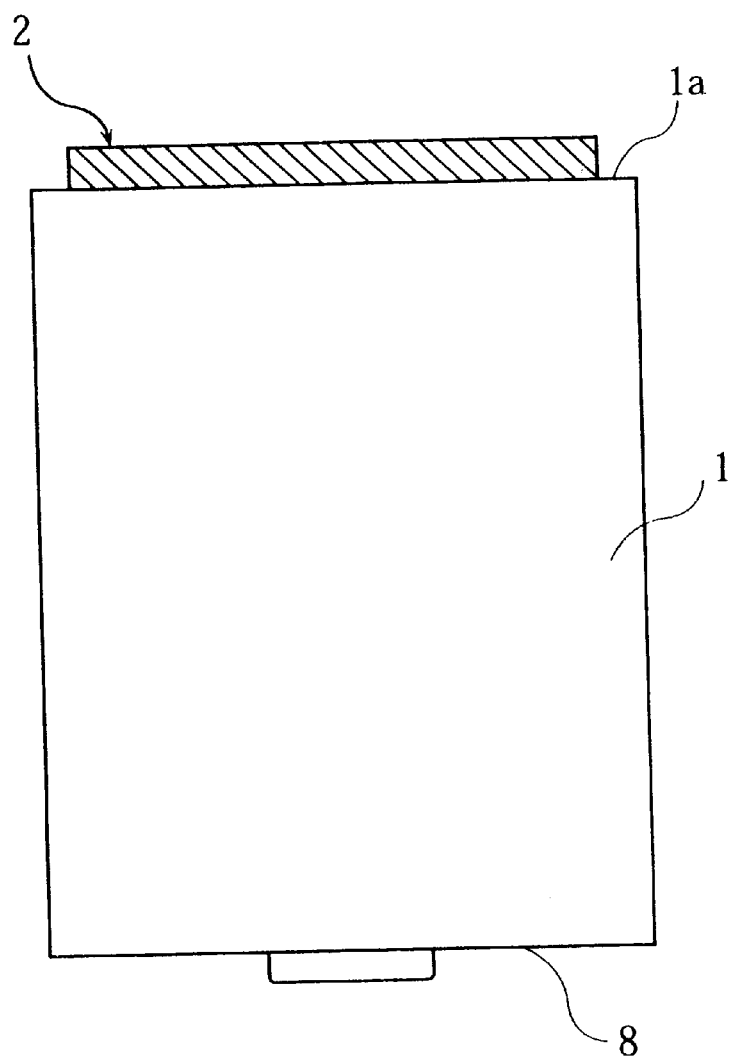
FIG. 2 is a cross section of a cell of a first embodiment of the present invention.

The square-type lithium ion cell of the present embodiment shown in FIG. 2 has an outer can 1 which has a bottom and is made of aluminum. The outer can 1 contains an unillustrated generating element which is composed of a positive electrode, a negative electrode, and a separator filled with an electrolyte. The outer can 1 has an opening which is sealed with a metallic sealing lid 8 and a bottom unit 1a to which a lead plate 2 for current-utilization is laser-welded. The lead plate 2 for current-utilization is made of nickel and has a thickness of 0.15 mm, a width of 5 mm, and a length of 30 mm.

The cell with this construction was assembled as follows. After the generating element was inserted into the outer can 1, the opening was sealed with the metallic sealing lid 8. Then, the lead plate 2 for current-utilization was placed on the outer surface of the bottom unit 1a and laser-welded with a laser welding device. The welding was applied to two weld zones under the following conditions.

laser energy: 12J pulse rate: 4 mm/sec, 10 pulses/sec.

Figure 3:
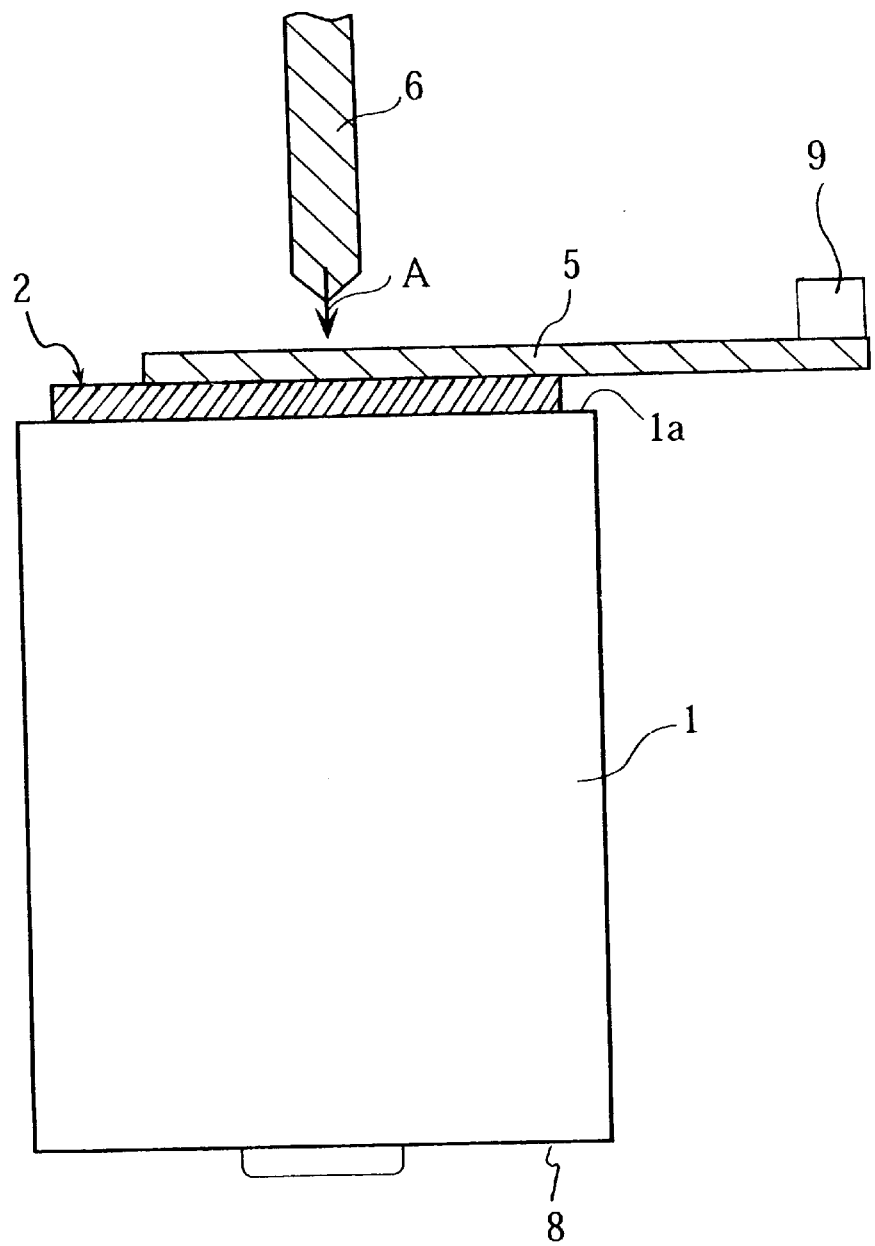
FIG. 3 is a cross section which shows a welding process of a lead plate for connection to the cell of the first embodiment.

As shown in FIG. 3, the lead plate 5 for connection is welded to the cell as follows: The lead plate 5 for connection which is made of nickel and to which a protective circuit 9 is welded is placed on the lead plate 2 for current-utilization. Then, a pair of resistance-welding electrodes 6 (one of the pair is shown) are lowered in the direction of the arrow "A" until the electrodes 6 are in contact with the non-welded area between the two laser-weld zones and then, the current is supplied. Consequently, the lead plate 2 for current-utilization and the lead plate 5 for connection are welded together at where the electrodes 6 are in contact with the non-welded area.

Although the laser welding of the lead plate 2 for current-utilization is conducted after the sealing operation of the opening of the outer can 1 in the present embodiment, it may be conducted prior to the sealing operation.

Experiment 1-1

The stretching strength between the outer can 1 and the lead plate 2 for current-utilization was measured after these had been laser-welded. The results are shown in Table 1. The measurement was conducted by using two samples and by bending and stretching the lead plates for current-utilization in the vertical direction. The values of the stretching strength shown in Table 1 belong to one of the two laser-weld zones.

TABLE 1

| stretching strengths ($kgf/cm^2$) | 1.58 |
| | 1.95 |
| average ($kgf/cm^2$) | 1.77 |

The results shown in Table 1 indicate that the laser welding offers sufficient stretching strength between the outer cans and the lead plates for current-utilization.

Experiment 1-2

The electrification ratio of the protective circuit 9 was checked when the lead plate 5 for connection and the lead plate 2 for current-utilization were resistance-welded. The results are shown in Table 2. For comparison, the electrification ratio of the protective circuit 9 was checked when the lead plate 5 for connection and the outer can 1 were laser-welded. The results are shown in Table 2, where one hundred cells were used as the cells of the present invention and another one hundred as the comparative cells.

TABLE 2

| | welding methods | number of defective cells |
|---|---|---|
| cells of present invention | resistance-welding | 0 |
| comparative cells | laser-welding | 13 |

The results shown in Table 2 indicate that when the lead plate 5 for connection and the lead plate 2 for current-utilization were resistance-welded, the protective circuit 9 was not electrified in any cell, whereas when the lead plate 5 for connection and the outer can 1 were laser-welded, the protective circuit 9 was electrified in some cells.

Embodiment 2

The second embodiment of the present invention will be explained as follows, based on FIGS. 4–7.

Figure 4:
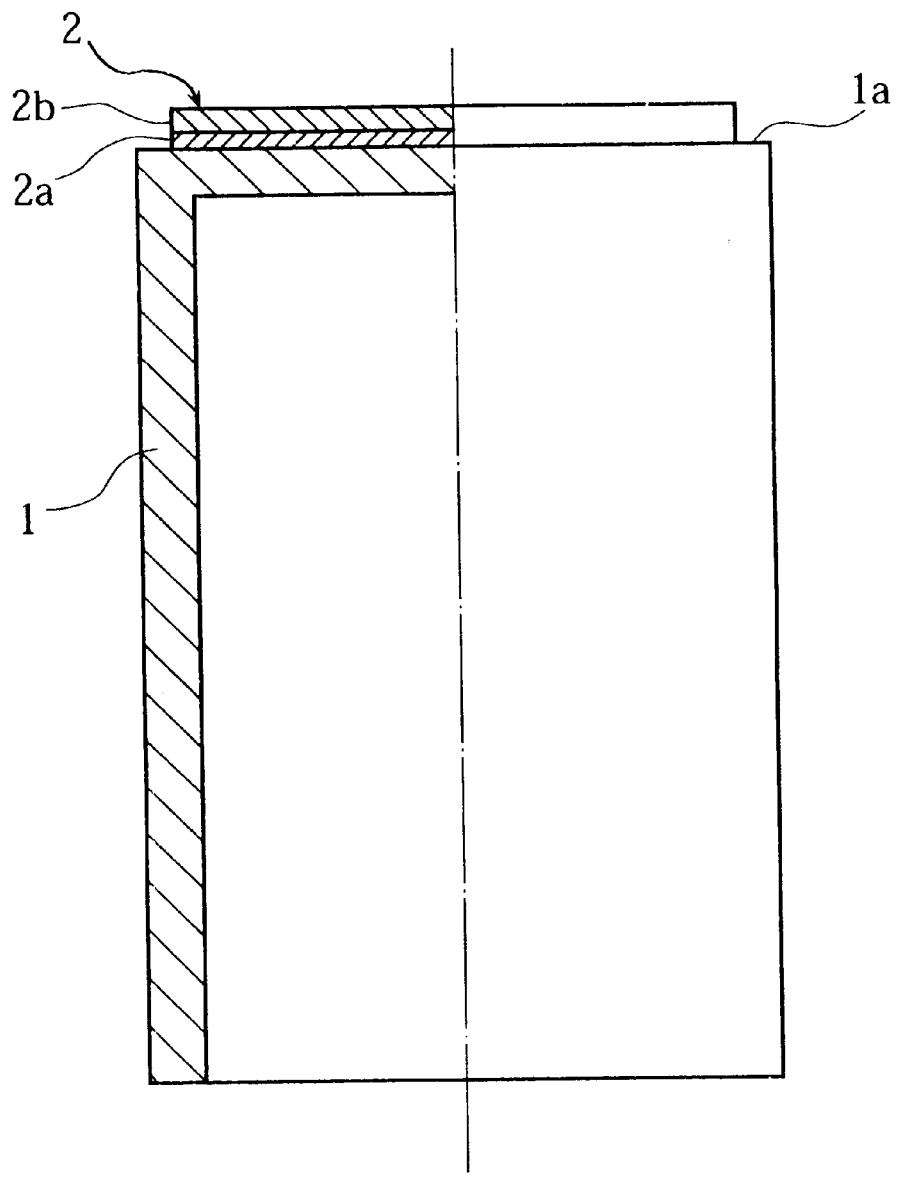
FIG. 4 is a half-cross section of a cell of a second embodiment of the present invention.

As shown in FIG. 4, the square-type lithium ion cell of the present embodiment is constructed in the same manner as in the first embodiment except that the lead plate 2 for current-utilization consists of a two-layered cladding which has the same thickness, width, and length as the lead plate 2 of the first embodiment; and that the lead plate 2 for current-utilization and the outer can 1 were ultrasonic-welded together. In FIG. 4 the generating element, the metallic sealing lid, and some other components are omitted.

Figure 5:
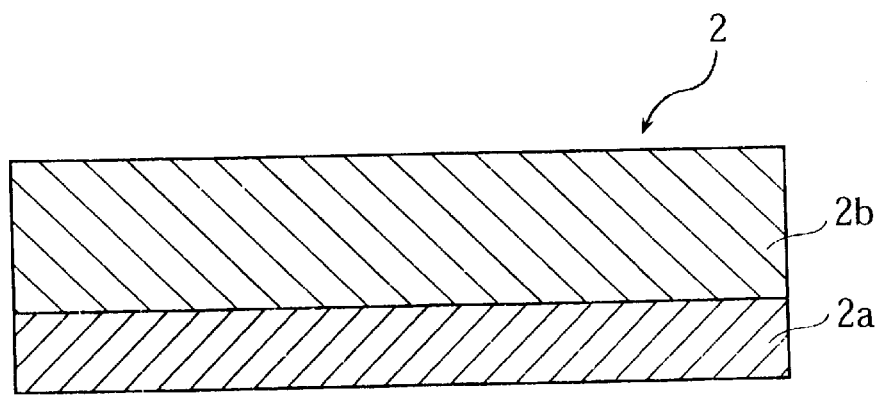
FIG. 5 is a cross section of the lead plate for current-utilization which is used for the cell of the second embodiment.

FIG. 5 shows the specific construction of the lead plate 2 for current-utilization, which consists of a first layer 2a which is welded to the outer can 1 and a second layer 2b which is formed on the other surface of the first layer 2a. The first layer 2a has a thickness of 0.05 mm, and is made of aluminum considering the connectivity with the outer can 1. On the other hand, the second layer 2b has a thickness of 0.10 mm and is made of nickel in consideration of the connectivity with the lead plate 5 for connection.

Figure 6:
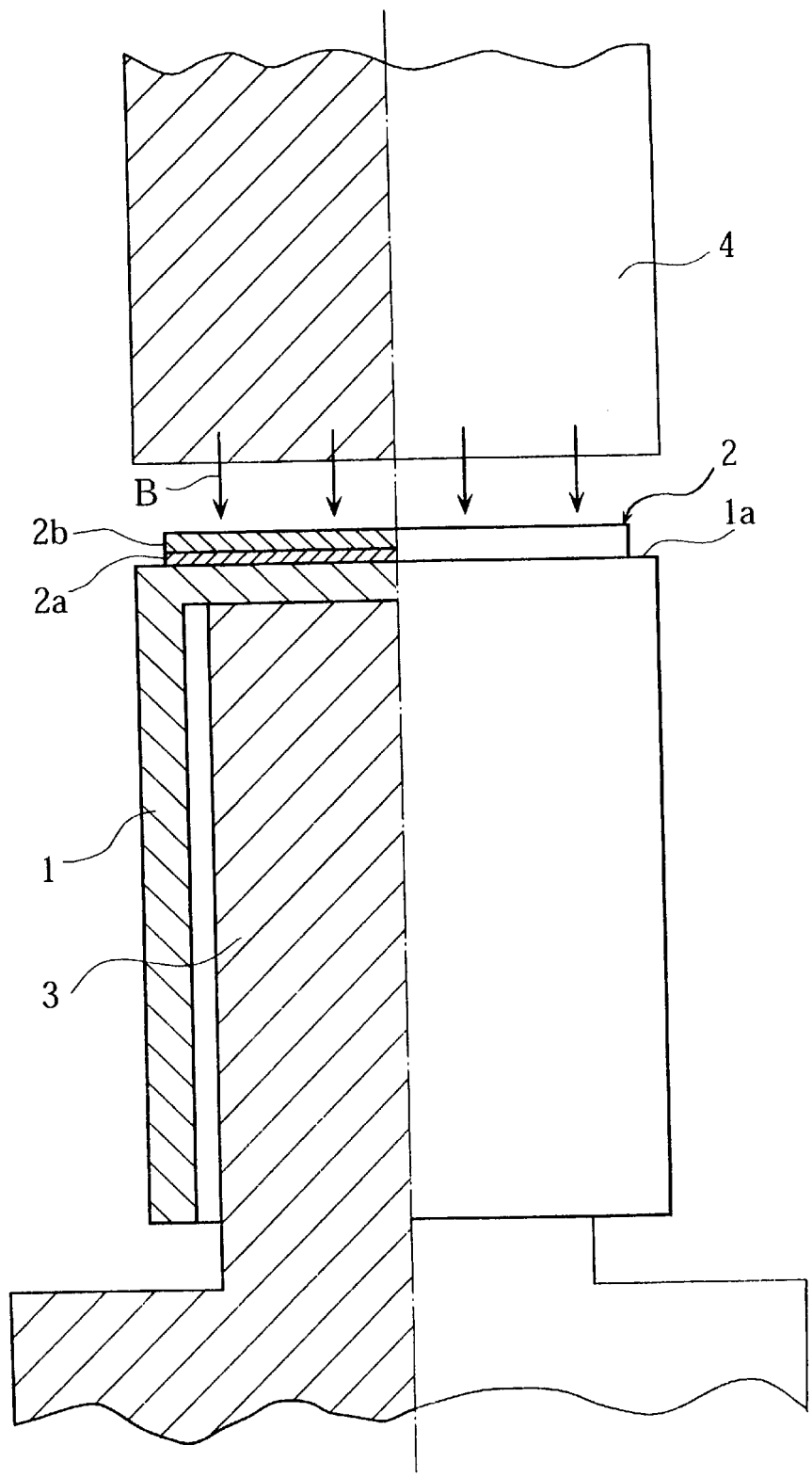
FIG. 6 is a half-cross section which shows an ultrasonic welding process when the cell of the second embodiment is assembled.

The cell with this construction was assembled as follows: As shown in FIG. 6, the outer can 1 was inserted into a pillar-shaped ultrasonic-welding anvil 3 from its opening and supported at the top of the anvil 3. The lead plate 2 for current-utilization was mounted on the outer surface of the bottom unit 1a of the outer can 1 so that the first layer 2a made of aluminum faced the outer can 1. Then, the ultrasonic horn 4 was lowered in the direction of the arrow "B" so as to press the lead plate 2 for current-utilization, thereby ultrasonic-welding the lead plate 2 for current-utilization to the outer can 1. Consequently, the lead plate 2 for current-utilization was welded to the outer can 1 at the two weld zones where the ultrasonic horn 4 and the lead plate 2 for current-utilization were in contact with each other. The welding device used and welding conditions are as follows.

welding device: Branson 910M
ultrasonic energy: 60J
frequency: 20 kHz
amplitude: 30 $\mu$m
pressure: 40 PSI(1 PSI=0.07 kgf/cm$^2$)

The cell was completed after inserting the generating element into the outer can 1 and sealing the opening of the outer can 1 with the metallic sealing lid 8.

Figure 7:
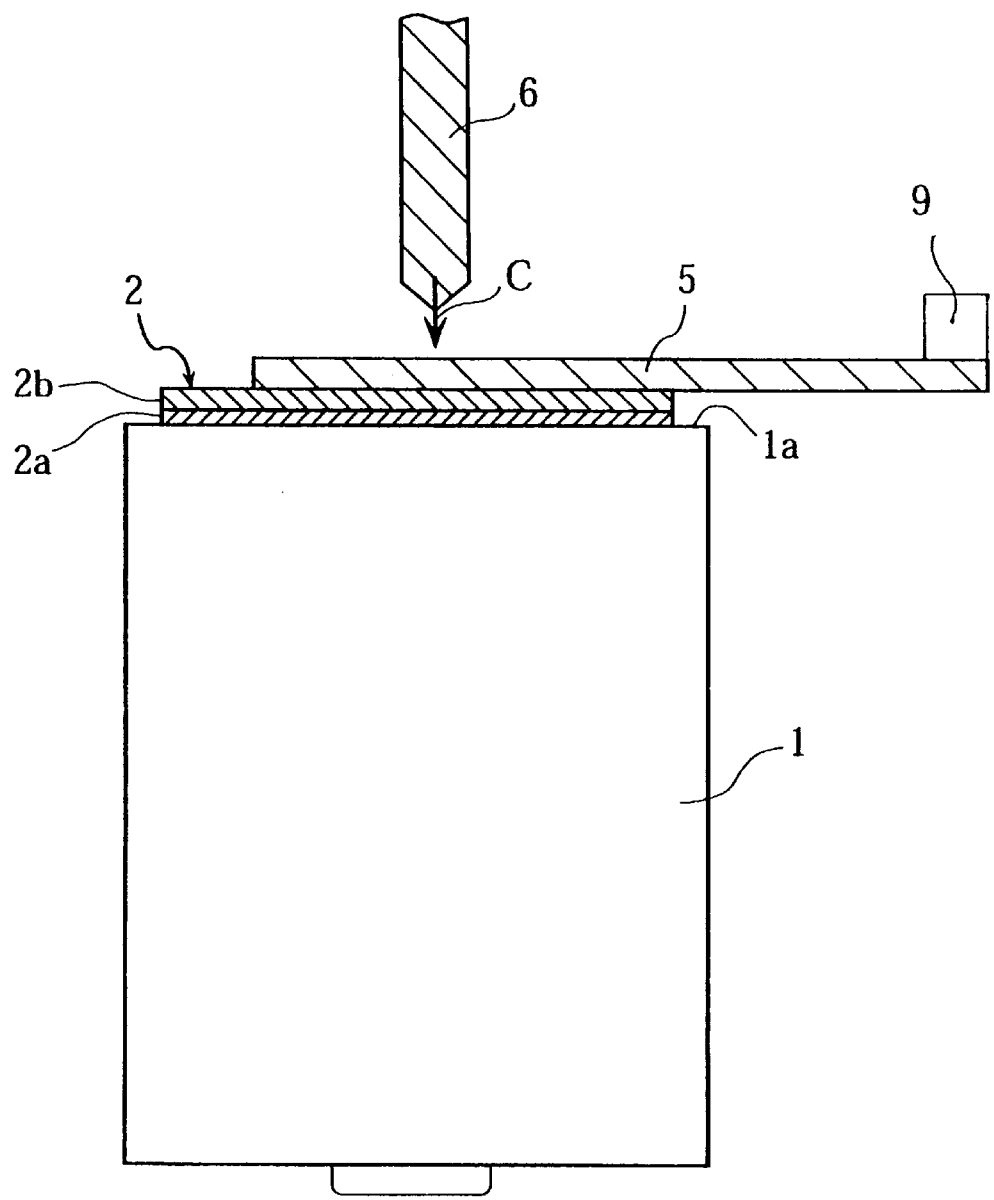
FIG. 7 is a cross section which shows a welding process when a lead plate for connection is welded to the cell of the second embodiment.

As shown in FIG. 7, the lead plate 5 for connection is welded to the cell as follows: The lead plate 5 which is made of nickel and to which a protective circuit 9 is welded is placed on the second layer 2b of the lead plate 2 for current-utilization. Then, a pair of resistance-welding electrodes 6 (one of the pair is shown) are lowered in the direction of the arrow "C" until the electrodes 6 are in contact with the non-welded area between the two ultrasonic-welded zones and then the current is supplied. Consequently, the lead plate 2 for current-utilization and the lead plate 5 for connection are welded at where the electrodes 6 are in contact with the non-welded area.

As for the production of the lead plate 2 for current-utilization, an aluminum plate and a nickel plate were stacked, and then either heated or pressed.

Experiment 2-1

The stretching strength between the outer can 1 and the lead plate 2 for current-utilization was measured after these had been ultrasonic-welded. The results are shown in Table 3. The welding conditions were the same as in Experiment 1-1 of the first embodiment except that the energy was varied. The measurement was conducted by using two samples for each and by bending and stretching the lead plate 2 for current-utilization in the vertical direction. The values of the stretching in Table 3 belong to one of the two ultrasonic-welded zones.

TABLE 3

| energy (J) | pressure (air pressure) | amplitude ratio | stretching strength (kgf/cm$^2$) | |
|---|---|---|---|---|
| 60 | 40PSI (fixed) | 100% (fixed) | 4.34 | 4.53 |
| 50 | " | " | 4.14 | 4.16 |
| 40 | " | " | 3.76 | 4.04 |
| 30 | " | " | 3.08 | 2.77 |
| 20 | " | " | 2.32 | 1.70 |
| 10 | " | " | 2.74 | 2.10 |
| 5 | " | " | 0.96 | 1.14 |

The results shown in Table 3 indicate that the ultrasonic welding offers sufficient stretching strength between the outer can and the lead plate current-utilization.

Although the stretching strength is reduced as the ultrasonic energy is decreased, the strength can be improved by enlarging the pressure.

Experiment 2-2

The stretching strength between the lead plate 5 for connection and the lead plate 2 for current-utilization was measured after these had been resistance-welded. The results are shown in Table 4. Four samples were used as the lead plates 5, and, two of them had a width of 3 mm and the other two had a width of 5 mm. The values of the stretching strength in Table 4 belong to one of the two resistance-welded zones.

TABLE 4

| widths of lead plates for connection | 5 mm width | 3 mm width |
|---|---|---|
| stretching strength (kgf/cm$^2$) | 3.75 | 4.11 |
| | 2.52 | 3.89 |
| average (kgf/cm$^2$) | 3.14 | 4.00 |

The results shown in Table 4 indicate that the resistance welding offers sufficient stretching strength between the lead plate 2 for current-utilization and the lead plate 5 for connection, regardless of the width of the lead plate 5.

Experiment 3

The stretching strength between the outer can 1 and the lead plate 2 for current-utilization was measured after these were ultrasonic-welded, supplied with an electrolyte, and preserved for a predetermined time period. The measurement was conducted by using seven samples: three were measured before the preservation; another two after a two-day preservation, the next two a 13-day preservation, and the remaining one a 22-day preservation. The results are shown in Table 5. The welding conditions were the same as in Experiment 1-2 of the first embodiment. The measurement was conducted by bending and stretching the lead plate 2 for current-utilization in the vertical direction. The values of the stretching strength in Table 4 belong to one of the two ultrasonic-welded zones. The electrolyte was prepared by mixing ethylene carbonate and diethyl carbonate at a volume ratio of 40:60 and then dissolving 1 mol/liter of $LiPF_6$ as a solute in the mixture.

TABLE 5

| stretching strength ($kgf/cm^2$) | | | |
|---|---|---|---|
| before preservation | after 2-day preservation | after 13-day preservation | after 22-day preservation |
| 2.81 | 2.41 | 3.24 | 3.98 |
| 3.84 | 4.04 | 3.66 | |
| 3.26 | | | |

The results shown in Table 5 indicate that sufficient stretching strength is obtained between the outer can 1 and the lead plate 2 for current-utilization after these were supplied with the electrolyte and preserved.

(Others)

(1) In these embodiments, the lead plate 2 for current-utilization is welded to the outer surface of the bottom of the outer can 1. However, it may be welded to any other portion of the outer surface of the outer can 1. As for the welding of the lead plate 2 for current-utilization and the lead plate 5 for connection, their weld zone is not restricted on the outer surface of the outer can 1. The lead plate 2 for current-utilization may be extended from the surface of the outer can 1 and welded to the lead plated 5 for connection at a distant position from the outer can 1. However, this is not preferable because the extended plate 2 could obstruct the cell assembling operation.

(2) The first layer of the lead plate 2 for current-utilization can be made from aluminum or an aluminum alloy such as aluminum-manganese, and the second layer can be made from nickel, nickel-plated iron, nickel-plated stainless, nickel-plated copper, or the like.

(3) Although the embodiments cite a non-aqueous electrolyte secondary cell as an example of the present invention, the present invention can be applied to other types of cells as long as their outer cans are made from aluminum or an aluminum alloy.

(4) The outer can 1 contains a generating element composed of a positive electrode, a negative electrode, and a separator filled with an electrolyte. These components can be made from the following materials in the case of a non-aqueous electrolyte secondary cell.

The positive electrode active material can be made from $LiCoO_2$, $LiNiO_2$, $LiMnO_2$, $LiMn_2O_4$, $LiFeO_2$, or the like.

The negative electrode can be made from lithium, an alloy which absorbs and desorbs lithium ions, carbon material which absorbs and desorbs lithium ions, or the like.

The solvent of the electrolyte can be an organic solvent such as ethylene carbonate, vinylene carbonate, or propylene carbonate, or a mixture of the organic solvent and a low-boiling-point solvent such as dimethyl carbonate, diethyl carbonate, 1,2-dimethoxyethane, 1,2-diethoxyethane, or ethoxymethoxyethane.

The solute of the electrolyte can be $LiPF_6$, $LiClO_4$, $LiCF_3SO_3$, or the like.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A cell comprising:

a positive electrode;

a negative electrode;

a separator filled with an electrolyte;

an outer can which has a bottom and which is composed of one of aluminum and an aluminum alloy; and a first lead plate for utilizing current, said first lead plate being welded to an outer surface of said outer can, and also welded to a second lead plate for electrically connecting said cell with a protective circuit.

2. The cell of claim 1, wherein said first lead plate is made from a metal whose conductivity is lower than aluminum and the aluminum alloy.

3. The cell of claim 1, wherein material of said first lead plate is selected from a group consisting of nickel, iron, a nickel alloy, and an iron alloy.

4. The cell of claim 1, wherein said outer can and said first lead plate are laser-welded.

5. The cell of claim 1, wherein said first lead plate includes a cladding plate having a first layer and a second layer, said first layer being made from one of aluminum and the aluminum alloy and welded to said outer can, and said second layer being welded to said second lead plate.

6. The cell of claim 5, wherein said outer can and said first lead plate are ultrasonic-welded.

7. The cell of claim 5, wherein said first layer has a thickness of 0.05 to 0.5 mm.

8. The cell of claim 5, wherein said second layer is a metallic plate whose conductivity is lower than aluminum and the aluminum alloy.

9. The cell, of claim 5, wherein material of said second layer is selected from a group consisting of nickel, nickel-plated iron, nickel-plated stainless, and nickel-plated copper.

10. The cell of claim 1, wherein material of said positive electrode is selected from a group consisting of $LiCoO_2$, $LiNiO_2$, $LiMnO_2$, $LiMn_2O_4$, and $LiFeO_2$.

11. The cell of claim 1, wherein a solvent of said electrolyte is at least one organic solvent which is selected from a group consisting of ethylene carbonate, vinylene carbonate, and propylene carbonate, or a mixture of said at least one organic solvent and at least one low-boiling-point solvent which is selected from a group consisting of dimethyl carbonate, diethyl carbonate, 1,2-dimethoxyethane, 1,2-diethoxyethane, and ethoxymethoxyethane.

12. The cell of claim 1, wherein a solute of said electrolyte is selected from a group consisting of $LiPF_6$, $LiClO_4$, and $LiCF_3SO_3$.

13. The cell of claim 1, wherein material for said negative electrode is selected from a group consisting of lithium, an alloy which absorbs and desorbs lithium ions, and carbon material which absorbs and desorbs lithium ions.

14. The cell of claim 2, wherein said outer can and said first lead plate are laser-welded.

15. The cell of claim 3, wherein said outer can and said first lead plate are laser-welded.

16. The cell of claim 5, wherein material of said positive electrode is selected from a group consisting of $LiCoO_2$, $LiNiO_2$, $LiMnO_2$, $LiMn_2O_4$, and $LiFeO_2$.

17. The cell of claim 5, wherein a solvent of said electrolyte is at least one organic solvent which is selected from a group consisting of ethylene carbonate, vinylene carbonate, and propylene carbonate, or a mixture of said at least one organic solvent and at least one low-boiling-point solvent which is selected from a group consisting of dimethyl carbonate, diethyl carbonate, 1,2-dimethoxyethane, 1,2-diethoxyethane, and ethoxymethoxyethane.

18. The cell of claim 5, wherein a solute of said electrolyte is selected from a group consisting of $LiPF_6$, $LiClO_4$, and $LiCF_3SO_3$.

19. The cell of claim 5, wherein material for said negative electrode is selected from a group consisting of lithium, an alloy which absorbs and desorbs lithium ions, and carbon material which absorbs and desorbs lithium ions.

* * * * *

UNITED STATES PATENT AND TRADEMARK OFFICE
CERTIFICATE OF CORRECTION

PATENT NO.   : 5,976,729                                          Page 1 of 1
DATED        : September 21, 1999
INVENTOR(S)  : Tom Goetz, Manickam R. Sridhar and Mukesh Orasad It is certified that error appears in the above-identified patent and that said Letters Patent is hereby corrected as shown below:

<u>Drawings,</u>
Figure 4E, delete "13" and substitute -- 31 --

Signed and Sealed this

Eighth Day of October, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.   : 5,976,729
DATED        : November 2, 1999
INVENTOR(S)  : Takuma Morishita It is certified that error appears in the above-identified patent and that said Letters Patent is hereby corrected as shown below:

This certificate supersedes Certificate of Correction issued October 8, 2002, the number was erroneously mentioned and should be vacated since no Certificate of Correction was granted.

Signed and Sealed this

Twenty-first Day of January, 2003

JAMES E. ROGAN
*Director of the United States Patent and Trademark Office*